(No Model.)
T. GORSUCH.
BEE HIVE.
No. 293,449.  2 Sheets—Sheet 1.
Patented Feb. 12, 1884.
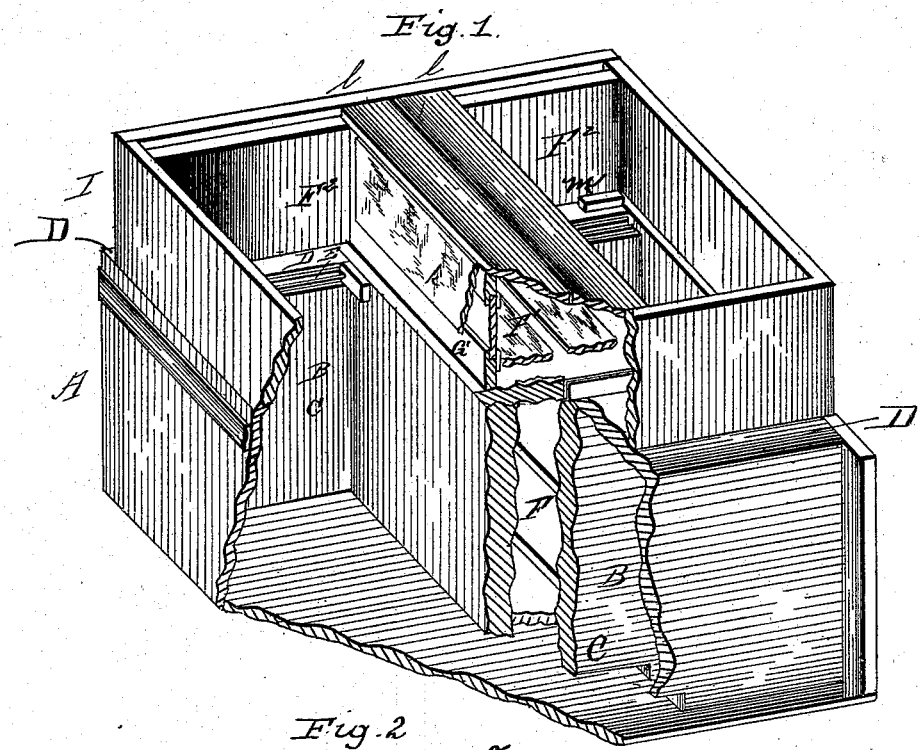
Fig. 1.
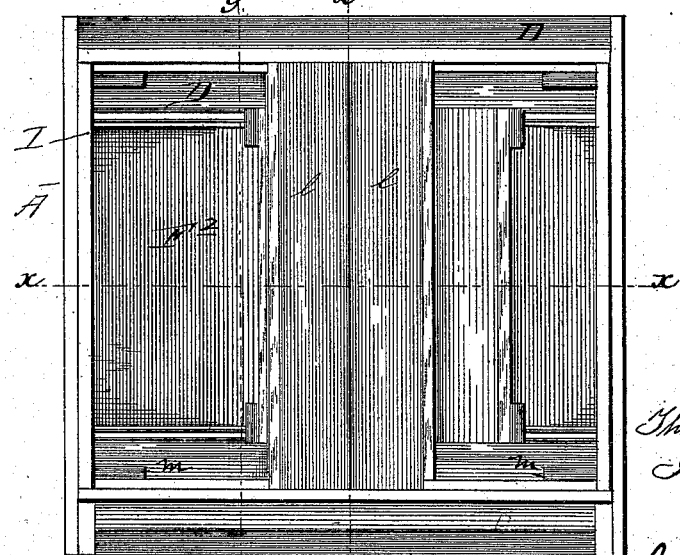
Fig. 2
WITNESSES
Thomas Gorsuch
Inventor
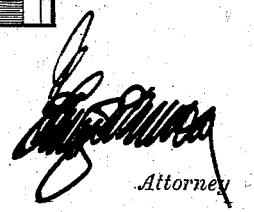
Attorney (No Model.) 2 Sheets—Sheet 2.
T. GORSUCH.
BEE HIVE.
No. 293,449. Patented Feb. 12, 1884.
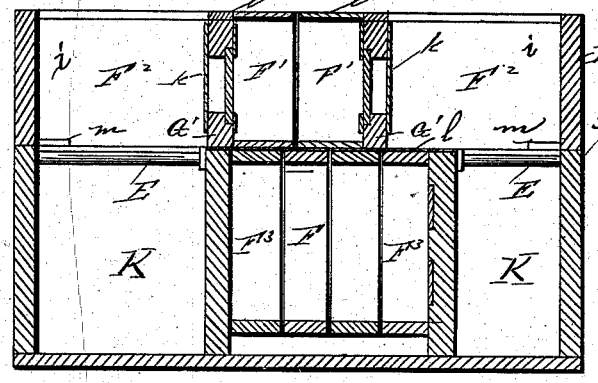
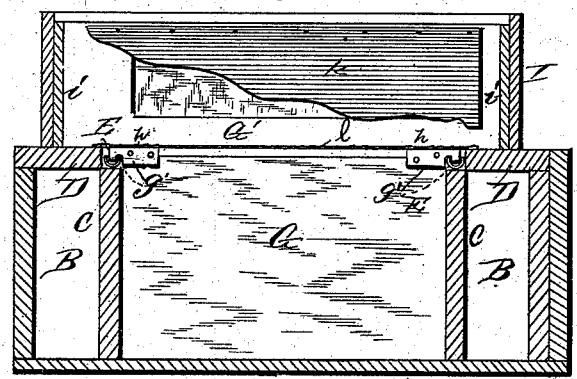
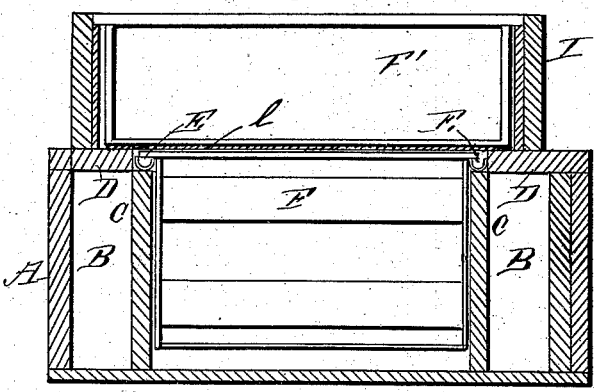
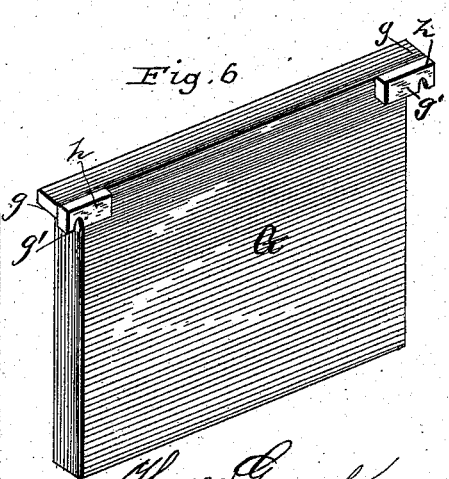
WITNESSES
Thomas Gorsuch
INVENTOR
By
Attorney

UNITED STATES PATENT OFFICE.

THOMAS GORSUCH, OF HUNTINGDON, PENNSYLVANIA.

BEE-HIVE.

SPECIFICATION forming part of Letters Patent No. 293,449, dated February 12, 1884.

Application filed March 8, 1883. (No model.)

*To all whom it may concern:*

Be it known that I, THOMAS GORSUCH, a citizen of the United States of America, residing at Huntingdon, in the county of Huntingdon and State of Pennsylvania, have invented certain new and useful Improvements in Bee-Hives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates, especially, to beehives having two tiers of comb-frames—one above the other—and a suitable number of brood-frames arranged intermediately in the lower tier.

The objects of the improvements are to enable the frames of the lower tier to be removed and replaced without disturbing the frames of the upper tier or the brood-frames, to enable the progress of work by the bees to be observed without disturbing them or permitting them to escape from the frames, while also excluding light from the frames except at the times of observation, and to prevent the bees from leaving the frames and building combs in other parts of the hive.

The invention consists in certain novel constructions and combinations of devices, which will be hereinafter particularly described, and pointed out in the appended claims.

In the accompanying drawings, Figure 1 is a perspective view of a hive with its top removed and portions of its walls broken away to show the arrangement of the interior parts. Fig. 2 is a plan view of the hive with its top removed. Fig. 3 is a section on the line $x\,x$, Fig. 2. Fig. 4 is a section on the line $y\,y$, Fig. 2. Fig. 5 is a section on the line $z\,z$, Fig. 2. Fig. 6 is a perspective view of one of the adjustable walls detached.

The letter A refers to the outer casing of the hive, which is preferably rectangular in shape, the lower portion of the exterior casing being provided with rigid transverse partitions or walls C C, so as to provide chambers B B, which are filled with chaff, the tops of said chambers being closed by the boards D D, which are rigidly secured to the top of the lower casing and rest upon the edge of the walls C C. The outer casing and one of the walls C are cut away, as shown in Fig. 1, so that the bees can enter the brood-chamber, and the passage is covered to prevent the chaff closing the opening in the ordinary manner. It will be observed that chaff-chambers are only provided at the front and rear sides of the hive, the object of this construction being to secure a large amount of space, so that the brood-chamber can be expanded when necessary. Where the boards D join the partitions C are provided angular spaces, in which are secured metallic troughs E, which are U-shaped in cross-section, the side and bottom being secured, respectively, to the boards D and the top of the walls C. This trough E, besides answering the object hereinafter specified, will thoroughly close the joint between the top and partition. The trough E has a width between its vertical members equal to the width of the partitions C, and a height equal to about one-half of the thickness of the boards D. The brood-frames F, as well as the other frames, are of ordinary construction, except as to size, and the brood-frames occupy the central portion of the chamber and are suspended therein upon the troughs E. Frames $F^3$ are also suspended in like manner; but these end frames are not brood-frames, as I have found that the bees will not employ the same for this purpose, but will store honey therein. The frames are suspended, as usual, at a little distance apart, so that the bees may pass between them and reach the troughs E E, along which they may travel from one frame to another.

G G indicate adjustable walls, the top or upper strip of which projects, as shown at $g\,g$, which projecting portion rests upon the troughs E E. These partitions are for the purpose of preventing the bees from passing from the frames F $F^3$ to the unoccupied lower portion of the hive, and in order to prevent the bees traveling through the troughs E E the projecting portions $g\,g$ of the partitions are provided with downward extensions $g'\,g'$, these downward extensions being preferably formed by securing small pieces of leather $h\,h$ to one side of the projecting shoulders $g\,g$ and slitting these pieces of leather, as shown in Fig. 6, so as to fit snugly over the front walls of the troughs and fill the central space. It will be readily seen and understood by this arrangement of the partition G that a greater or lesser number of frames may be suspended upon the troughs, and that spaces K K will be provided between the partitions G and the casing A, which will obviate the use of chaff-chambers, which are rendered unnecessary at this portion of the hive. Blocks m are secured to the boards D, in order to hold the upper casing in proper position upon the lower casing, so as to prevent lateral displacement of the parts. The top casing or upper removable section of the hive is indicated by the letter I, and rests upon the boards D D, which cover the chaff-chambers, and the surplus boxes or honey-frames F' are suspended therein in the usual manner, the upper portions of the same resting upon the boards $i\ i$, attached to the inside of the outer casing. The frames F' are of a greater length than the brood-frames F, and cross the hive in the same direction. By this arrangement the lower frames, $F^3$, adjacent to the brood-frames F, may be readily removed and others replaced without removing the top casing or in any way disturbing the frames in the upper part of the hive.

In the upper part of the hive spaces $F^2$ are provided, in order that access may be had to the lower frames. These spaces are separated from the frames F' by means of the movable partitions G', which rest upon the boards $i\ i$ in the same manner as the frames F'. These partitions are provided with the usual glass windows, through which the working of the bees may be observed, and these windows are guarded or covered by flexible covers $k\ k$, which are attached to the partitions so as to hang normally over the same, but may be folded over the top of the partitions when desired. By this arrangement, when it is desired to observe the working of the bees, it is not necessary to remove or disturb the partitions.

The frames F' and partitions G' are suspended upon the vertical boards $i\ i$, and are not supported by the brood-frames, as has been customary, and is not a practical construction in my hive, as if such were employed the removal of one of the frames would be liable to disturb the other frames.

The brood-frames and surplus or honey frames are separated from each other by pieces of textile fabric $l\ l$, which are laid over the brood-frames, which cloth is made in two or more pieces, either of which may be removed and replaced without disturbing the other, and which may be folded back, so as to allow the bees to enter from the brood-chambers to the honey-boxes.

Having now fully described my invention, what I claim is—

1. The combination, with the grooved plates or troughs for supporting the ends of the frames, of the adjustable walls or partitions having shoulders projecting over said troughs, and provided with downward extensions projecting into and closing the passages through said troughs, substantially as and for the purpose set forth.

2. The combination, with the troughs E E, constructed and arranged as described, of one or more adjustable walls, G, having shoulders $g$, and the leather pieces $h\ h$, attached to said shoulders and slitted to take over and into said troughs, essentially as and for the purpose set forth.

3. The bee-hive having the brood-frame chamber, with the brood-frames arranged in the central part thereof, the upper honey-frame casing having a comb-space wider than the lower chamber and immediately over the same, said upper casing having its bottom open for the passage of the lower comb-frames, and the adjustable partitions G, arranged to divide the comb-frames in the lower chamber from unoccupied spaces at the ends of said chamber, and cloths $l\ l$, located between the brood and honey frames, the parts being organized substantially as described, and for the purpose set forth.

4. In a bee-hive, the lower casing provided with chaff-chambers B B, partitions C C, and boards D D, with blocks $m$ secured thereon, so as to provide supports for the frames F and partitions G, and an upper section, I, with sides $i\ i$, frames F', and flexible and removable separating means $l\ l$, the parts being organized substantially as shown, so as to provide spaces $F^2$ and K, into which the frames may be extended.

In testimony whereof I affix my signature in presence of two witnesses.

THOMAS GORSUCH.

Witnesses:
K. ALLEN LOVELL,
R. BRUCE PETRIKEN.